United States Patent [19]

Johnson et al.

[11] 3,863,232

[45] Jan. 28, 1975

[54] ASSOCIATIVE ARRAY

[75] Inventors: Darrel D. Johnson, Fishkill; Carl L. Kaufman, Wappingers Falls; Fred H. Lohrey, Poughkeepsie; Gordon J. Robbins, Wappingers Falls, all of N.Y.

[73] Assignee: International Business Machines Corporation, Armonk, N.Y.

[22] Filed: Dec. 26, 1973

[21] Appl. No.: 428,300

[52] U.S. Cl..... 340/173 AM, 340/172.5, 340/173 R

[51] Int. Cl. ............................................ G11c 15/00

[58] Field of Search .................. 340/172.5, 173 AM

[56] References Cited

UNITED STATES PATENTS 3,402,398 9/1968 Koerner ...................... 340/173 AM

*Primary Examiner*—Terrell W. Fears

*Attorney, Agent, or Firm*—Frank C. Leach, Jr.; J. B. Kraft

[57] ABSTRACT

An associative array of memory cells is arranged with its read cells interleaved with its storage cells to reduce the physical space required by the array. Two rows of read cells have four rows of storage cells on each side thereof except that the uppermost row of the read cells in the array has only two rows of the storage cells thereabove and the lowermost row of the read cells in the array has only two rows of the storage cells therebelow. One half of the read cells in each row of the read cells provides an output for one of the two adjacent rows of the storage cells.

21 Claims, 6 Drawing Figures

ASSOCIATIVE ARRAY

In an associative array, storage cells are formed by two bistables in two adjacent columns and read cells by one bistable. The storage cells are addressed by the content in each word, which is defined by a plurality of the storage cells disposed in a row, rather than with the physical location of the storage cells. Thus, when addressing an associative array, a parallel search of all the data stored in the rows of storage cells is made to detect all words matching the description of the search argument. This provides a potential for significant time saving since all internal comparisons in the associative array are carried out simultaneously.

When a match is discovered between the search argument and the word in the search array of the associative array, read cells, which are connected to the storage cells forming the particular word, provide an output. An OR of the output of the read cells is supplied as the read out of the information in the search array of the associative array. Accordingly, all information stored in the search array of the associative array is accessible without regard to the location in which it is stored.

In the previous associative arrays, the search array, which usually comprises twice as many bistables as the read array, and the read array have been disposed in a side-by-side relationship with a matching detector therebetween. The matching detector enables the read cells when the storage cells, which are connected to the read cells, match the search argument.

In this type of arrangement, each of the columns of the storage bistables, which are arranged in rows and columns, has a pair of bit lines for searching and writing and storage bistable, and each column of the read cells has a pair of read bit lines for writing and reading each bistable forming one of the read cells in the column. Thus, the associative array in which the search array and the read array are disposed in a side-by-side relationship with matching detectors therebetween produces a rectangular shaped area, which takes a substantial amount of space on a chip.

The present invention overcomes this problem by providing an associative array in which the read array is interleaved with the search array. This requires only a substantially square area on the chip.

Furthermore, the associative array of the present invention reduces the number of read bit lines. It also enables the read cells to be written on the same bit lines as the bit lines on which the storage bistables in the same column are written.

In the associative array of the present invention, the storage bistables and the read bistables are arranged in rows and columns with two rows of storage cells (Each storage cell comprises two bistables in adjacent columns.) and a row of read cells (Each read cell comprises a single bistable.), which provides the output for the two rows of storage cells through having one-half of the read cells provide the output for one of the rows of the storage cells and the other half of the read cells provide the output for the other row of storage cells, being adjacent each other. The arrangement is preferably such that two of the rows of storage cells or two of the rows of read cells are always adjacent each other so that the two rows of storage cells or the two rows of read cells can share a common power distribution line.

This arrangement of the rows of storage or read cells produces a reduction in the area required for the power distribution line while still having the same power distribution as when the two rows of storage or read cells are separate from each other. This is because the width of the power distribution line is directly proportional to the current flowing therethrough. While the current flowing through the power distribution line for two of the rows of storage or read cells is twice that for one of the rows of storage or read cells, there is elimination of the space between two lines which would exist if two separate power distribution lines were utilized.

An object of this invention is to provide an interleaved associative array.

Another object of this invention is to provide an associative array requiring less space on a semiconductor chip.

A further object of this invention is to provide a unique memory cell circuitry.

The foregoing and other objects, features, and advantages of the invention will be apparent from the following more particular description of preferred embodiments of the invention, as illustrated in the accompanying drawings.

Figure 1:
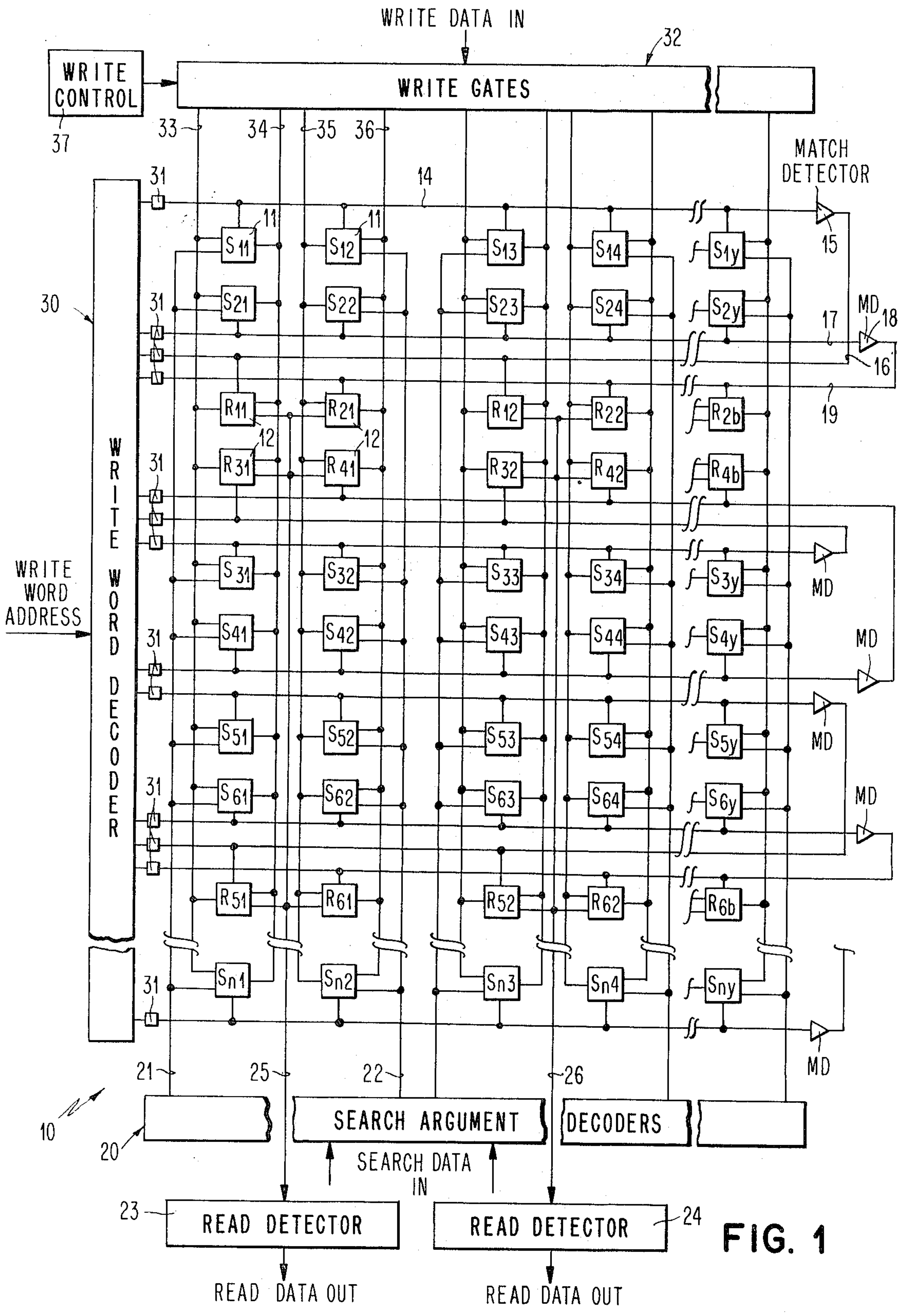
FIG. 1 is a schematic block diagram of a portion of an associative array showing one form of the array of the present invention.

Referring to the drawings and particularly FIG. 1, there is shown an associative array 10 having memory cells, which comprise three-state storage cells 11 and read cells 12, arranged in rows and columns. Each of the storage cells 11 comprises two bistables in adjacent columns while each of the read cells 12 comprises a single bistable.

There are two rows of the read cells 12 with four rows of the storage cells 11 on each side thereof except at the upper and lower ends of the associative array 10. Above the uppermost row of the read cells 12, there are only two rows of the storage cells 11. Similarly, below the lowermost row of the read cells 12, there are only two rows of the storage cells 11.

Each of the bistables of the storage cells 11 is identified by $S_{xy}$ where $x$ is the row of the bistables of the storage cells 11 and $y$ is the column in which the bistable is disposed with the bottom row being identified by $n$. Each of the read cells 12 is identified by $R_{ab}$ where $a$ coresponds to the row of the storage cells with which the read cell 12 is connected and $b$ represents the column in which the read cell 12 is disposed and counting only the read cells 12 connected to the particular row of the storage cells 11.

The number of the read cells 12 is equal to the number of the storage cells 11. Of course, the number of the bistables of the storage cells 11 is twice the number of the read cells 12 since each of the read cells 12 comprises only one bistable.

As shown in FIG. 1, each two adjacent rows of the storage cells 11 have the row of the read cells 12 providing the output for each of these two rows of the storage cells 11 adjacent to one of the rows of the storage cells 11. Thus, the two rows of the storage cells 11 and the row of the read cells 12, which is the output for each of the two rows of the storage cells 11, are adjacent to each other.

Instead of the arrangement shown in FIG. 1, it should be understood that there could be a single row of the read cells 12 having two rows of the storage cells 11 on each side thereof except for the uppermost and lowermost rows of the read cells 12. The uppermost row of the read cells 12 would have only one of the rows of the storage cells 11 thereabove and the lowermost row of the read cells 12 would have only one of the rows of the storage cells 11 therebeneath. This arrangement also results in the two rows of the storage cells 11 and the row of the read cells 12, which is the output for each of the two rows of the storage cells 11, being adjacent to each other.

As shown in FIG. 1, the first row of the storage cells 11 includes bistables $S_{11}$, $S_{12}$, $S_{13}$, $S_{14}$, etc. with the bistables $S_{11}$ and $S_{12}$ forming one of the storage cells 11 and the bistables $S_{13}$ and $S_{14}$ forming another of the storage cells 11, for example. The second uppermost row of the storage cells 11 comprises bistables $S_{21}$, $S_{22}$, $S_{23}$, $S_{24}$, etc.

The row of the read cells 12 adjacent to the second uppermost row of the storage cells 11 comprises read cells $R_{11}$, $R_{21}$, $R_{12}$, $R_{22}$, etc. Each of the read cells 12 comprises a single bistable.

Each of the bistables $S_{11}$, $S_{12}$, $S_{13}$, $S_{14}$, etc. of the storage cells 11 is connected through a word line 14 to a match detector 15, which is connected through a word line 16 to the read cells $R_{11}$, $R_{12}$, etc. Thus, when the word being searched is found in the uppermost row of the storage cells 11 (the bistables $S_{11}$, etc.), then there is no mismatch on the word line 14 so that a signal is supplied through the match detector (MD) 15 and the word line 16 to the read cells 12 ($R_{11}$, $R_{12}$, etc.) in the odd columns of the uppermost row of the read cells 12 to cause an output therefrom.

Similarly, each of the bistables in the second row of the storage cells 11 (the bistables $S_{21}$, etc.) is connected to a word line 17. A match detector 18 is connected to the word line 17 and to a word line 19, which is connected to the read cells 12 ($R_{21}$, $R_{22}$, etc.) in the even columns in the same row as the read cells $R_{11}$, $R_{12}$, etc.

When a search of the words in the associative array 10 is to be made, each of the storage cells 11 receives signals from search argument decoders 20. The search argument decoders 20 are connected by separate search lines to each of the columns of the bistables of the storage cells 11. Thus, the search argument decoders 20 are connected by a search line 21 to the bistables $S_{11}$, $S_{21}$, etc. in the first column and by a search line 22 to each of the bistables $S_{12}$, $S_{22}$, etc. in the second column.

A signal is supplied to each of the storage cells 11 in the associative array 10 at the same time from the search argument decoders 20. If a one is being sought in any of the storage cells 11 connected to the search lines 21 and 22, then the potential of the search line 21 is raised above the potential of each of the storage cell word lines such as the word line 14, for example. If a zero is being sought in any of the storage cells 11 connected to the search lines 21 and 22, the potential of the search line 22 is raised above the potential of each of the storage cell word lines such as the word line 14, for example.

Whenever one of the rows of the storage cells 11 satisfies all the inputs to the storage cells 11 in that row, there is no mismatch on the word line such as the word line 14 for the uppermost row of the storage cells 11. As a result, the match detector for the word line of that row supplies a signal to the read cells 12 connected to the particular row of the storage cells 11 so that the read cells 12 provide an output.

Whenever any row of the storage cells 11 of the associative array 10 satisfies the search argument of the search argument decoders 20, then an output appears on read detectors 23 and 24, for example. The read detector 23 is connected to a read output line 25, which is connected to the read cells $R_{11}$ and $R_{21}$ and the read cells $R_{31}$ and $R_{41}$, for example, in columns one and two. Similarly, the read detector 24 is connected to a read output line 26, which is connected to the read cells $R_{12}$ and $R_{22}$ and the read cells $R_{32}$ *and* $R_{42}$, for example, in columns three and four.

Except during a search, the read detectors 23 and 24 must be disabled or they would have false outputs thereon. This is because the read detectors 23 and 24 are always connected to the read output lines 25 and 26, respectively, of the read cells 12.

When there is no search, the potential on the word line for the storage cells 11 is the same as when there is a match during search. Therefore, if the read detectors 23 and 24 were not disabled except during search, an output would be provided to each of the read detectors 23 and 24 because the read cells 12 would be supplying an output to the read output lines 25 and 26 due to all of the word lines of the read cells 12 being at the potential which indicates a match in the storage cells 11 connected to each of the word lines of the read cells 12.

During search, the potential of the word line for the read cells 12 is maintained at its higher magnitude, which it has when there is no search, whenever the connected row of the storage cells 11 satisfies all of the inputs along the search lines to retain the lower potential of the word line for the storage cells 11. The match detector inverts this signal to maintain the potential of higher magnitude on the word line of the connected read cells 12. Whenever any of the word lines for the read cells 12 is maintained at its higher potential, a voltage appears on the read output lines 25 and 26.

Whenever there is a match during search, the read cells 12 connected to the storage cells 11 produce an output on each of the read output lines 25 and 26. Depending on the state of the read cell 12 connected to the read output line 25 or 26, this output can either be a zero or a one.

If any of the read cells 12 connected to the read output line 25, for example, is a one, then a one is produced as the output by the read detector 23 since the read detector 23 is deemed to include an OR gate, which supplies an output bit of one whenever it receives an input of one from any of the read cells 12 connected to the read output line 25. A similar arrangement exists with the read detector 24 and any other read detectors.

Whenever there is a mismatch during search, the voltage of the word line for the connected storage cells 11 increases. As a result, the match detector inverts this signal to lower the potential on the word line of the connected read cells 12. When the potential on the word line of the connected read cells 12 is reduced, no voltage can appear from the read cells 12 on the read output lines 25 and 26.

When it is desired to write new data in the storage cells 11 and the read cells 12, a write word decoder 30 is connected through electronic switches 31 such as transistors, for example, to each of the word lines (the word lines 14, 16, 17, and 19, for example) for each of the rows of the storage cells 11 and each of the two output rows of the read cells 12 arranged in the same row.

Each of the columns of the bistables of the storage cells 11 and the read cells 12 is connected to write gates 32. Thus, the bistables of the storage cells 11 and the read cells 12 in the first column are connected to the write gates 32 by bit write lines 33 and 34. Similarly, the bistables of the storage cells 11 and the read cells 12 in the second column are connected by bit write lines 35 and 36 to the write gates 32. Accordingly, a signal from the write gates 32 can be applied to any of the columns of the associative array 10 through the common pair of bit write lines for a particular column of the bistables of the storage cells 11 and the read cells 12.

A write control 37 is connected to the write gates 32. The write control 37 enables the write gates 32 to be connected only to either the odd columns or the even columns at the same time.

Accordingly, to write in any of the rows of the storage cells 11 or the read cells 12, the write gates 32 are first enabled for either the odd or even columns by the write control 37. At the same time, the write word decoder 30 is connected through the appropriate electronic switches 31 to select one of the word lines 14, 16, 17, and 19, for example, and all of the match detectors such as the match detectors 15 and 18, for example, are inactivated.

With this arrangement, either half a search word (one bistable of each of the storage cells 11) or all of the read word, which is formed by the read cells 12 connected to a particular row of the storage cells 11, can be written at one time. This is because the read cells 12 for a particular row of the search cells 11 are arranged in only the odd or even columns. For example, the read cells $R_{11}$ and $R_{12}$ are disposed in the odd columns, and the read cells $R_{21}$ and $R_{22}$ are disposed in the even columns.

Accordingly, the interleaved associative array 10 of FIG. 1 is capable of reducing the space required on a chip so that only a substantially square area is needed if the number of the search words, which are defined by the rows of the storage cells 11, are selected in accordance with the number of the storage cells 11 forming a search word and the number of the read cells 12 forming a read word.

Considering the operation of the associative array 10 of FIG. 1, it would first be necessary to write in the data for each of the rows of the storage cells 11 to form a search word and for each of the rows of the read cells 12, which comprise the read word or output word of the row of the storage cells 11, connected to one of the rows of the storage cells 11. This is accomplished through three separate writing steps for one of the rows of the storage cells 11 and the row of the read cells 12 connected thereto.

Thus, one bistable of each of the storage cells 11 has data written therein through energizing the write gates 32 for the odd or even columns by the write control 37 while controlling the write word decoder 30 to activate the word line for the search word for the storage cells 11 in the row. Then, the other bistable of each of the storage cells 11 has data written therein through energizing the write gates 32 for the other of the odd or even columns by the write control 37 while controlling the write word decoder 30 to activate the same word line. Depending on whether the read cells 12 for the particular row of the storage cells 11 are in the odd or even column determines whether the write gates 32 energize the odd or even columns when writing of the read word is to occur. The write word decoder 30 also must activate the correct word line for the row of the read cells 12.

It should be understood that all of the match detectors are inactivated when there is writing in any of the word lines. This is because all of the other word lines for the storage cells 11 are down so that there would be false writing in the read cells 12 at this time because the match detectors would raise the potential on the word lines of the read cells 12 connected thereto.

When the write gates 32 are enabled for either the odd or even columns of the storage cells 11 and the read cells 12 by the write control 37, the write word decoder 30 could write data in all of the rows of the bistables of the storage cells 11 and all of the rows of the read cells 12 in these columns. Then, data would be written in all of the storage cells 11 and the read cells 12 in the other columns.

Instead of writing in this manner, each of the rows of the storage cells 11 could be completely written along with the read cells 12, which provide the output word for the particular row of the storage cells 11, before another row of the storage cells 11 is written. In this arrangement, if the odd write gates 32 are enabled by the write control 37, then the bistables $S_{11}$, $S_{13}$, etc. would be first written. Next, the read celss $R_{11}$, $R_{12}$ would be written since they are in the same odd columns as the bistables $S_{11}$, $S_{13}$, etc. Then, when the even write gates 32 are enabled by the write control 37, the other half of the bistables ($S_{12}$, $S_{14}$, etc.) of the row of the storage cells 11 connected to the word line 14 would be written.

After all of the search and read words have been written in the associative array 10, the associative array 10 can be searched whenever desired for a particular search word. This is accomplished through activating the search argument decoders 20.

Whenever there is a mismatch on one of the word lines (14 or 17, for example) for the storage cells 11, the potential on the word line of the storage cells 11 increases. As a result, the match detector causes a reduced voltage on the word line for the connected read cells 12 so that the connected read cells 12 do not supply any signal to the read output lines 25 and 26, for example.

Whenever there is no mismatch on one of the word lines (14 or 17, for example) then the potential of the word line of that particular row of the storage cells 11 is not raised so that the voltage inversion through the match detector causes the higher potential to be supplied to the word line of the connected read cells 12. If the row of the storage cells containing the bistables $S_{11}$, $S_{12}$, etc., for example, has no mismatch on the word line 14, then the lower potential is supplied through the match detector 15 where it is inverted to become a higher potential supplied through the word line 16 to the read cells $R_{11}$, $R_{12}$, etc. Each of the read cells $R_{11}$, $R_{12}$, etc. then provides an output word (one or zero) through the read output lines 25 and 26 to the read detectors 23 and 24, respectively.

If more than one of the rows of the read cells 12 is satisfied because more than one of the search words satisfies the search argument from the search argument decoders 20, then there would be more than one of the read cells 12 supplying a signal to each of the read output lines 25 and 26. If any of the signals from the read cells 12 to the connected read output line 25 or 26, for example, is a one, then the read detector 23 or 24 has an output of one. The read detector 23 or 24 has a zero output only if all of the read cells 12, which are connected to the read output line 25 or 26 and have been activated through their connected search word satisfying the search argument, are in the zero state.

Figure 2:
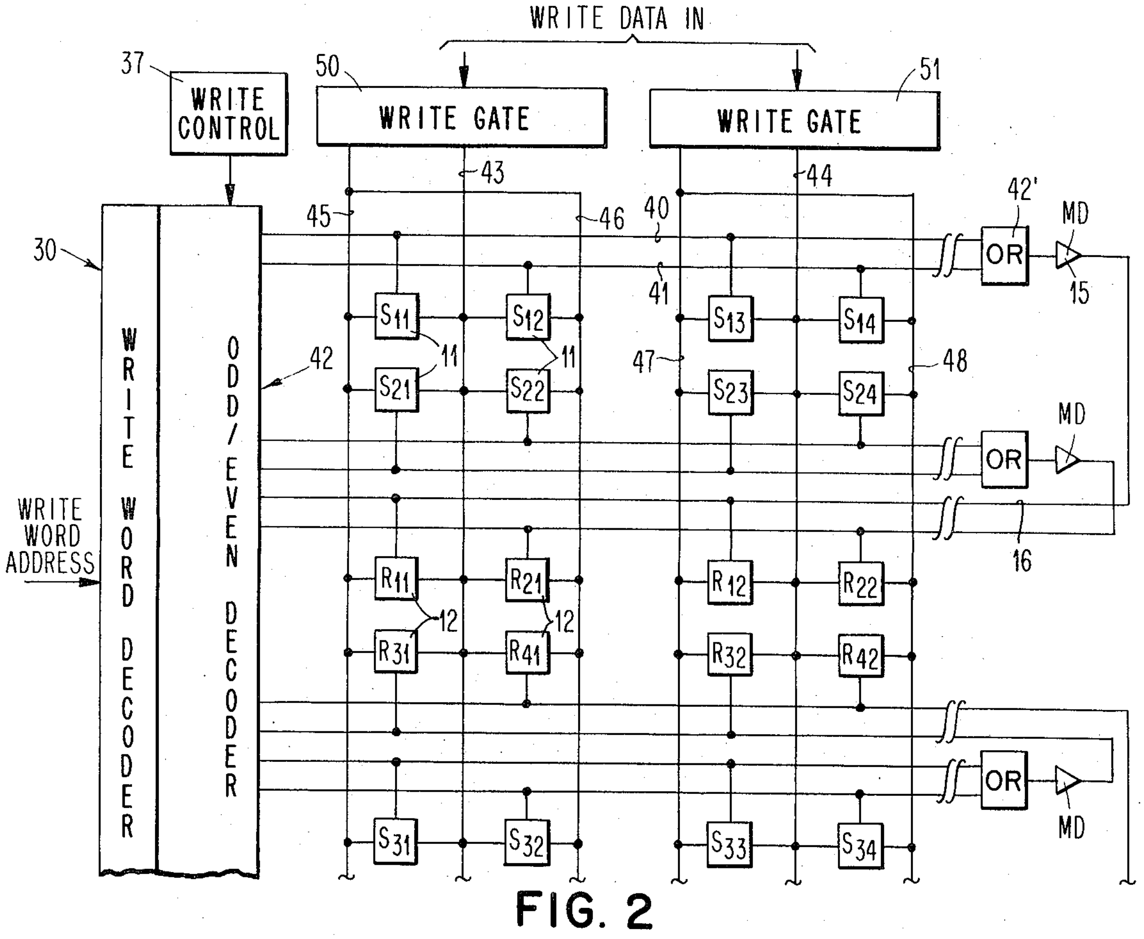
FIG. 2 is a schematic block diagram showing another form of the associative array of the present invention for use with a portion of the associative array of FIG. 1.

Referring to FIG. 2, there is shown another arrangement for connecting the bistables of the storage cells 11 and the read cells 12 of the associative array 10 of FIG. 1 for writing data (ones and zeros) in the storage cells 11 and the read cells 12. Each of the storage cells 11 comprises two bistables, and each of the read cells 12 comprises one bistable.

The storage cells 11 of each of the rows are connected to two separate word lines rather than a single word line with all of the bistables in the odd columns of the associative array 10 for one of the search words being connected to one word line while all of the bistables of the storage cells 11 of a particular row, which forms the same search word, in the even columns being connected to another word line. Thus, the bistables $S_{11}$, $S_{13}$, etc. are connected to a word line 40 while the bistables $S_{12}$, $S_{14}$, are connected to a word line 41. The word lines 40 and 41 are connected through an OR gate 42' to the match detector 15, which is connected to the word line 16 for the read cells $R_{11}$, $R_{12}$, etc.

The write word decoder 30 is connected to the word lines 40 and 41 through an odd/even decoder 42. The odd/even decoder 42 is controlled by the write control 37 so that either the word line 40 or the word line 41 is connected to the write word decoder 30 when writing one of the search words. Thus, the bistables $S_{11}$, $S_{13}$, etc., which are connected to the word line 40, are written at one time while the bistables $S_{12}$, $S_{14}$, etc., which are connected to the word line 41, are written at another time.

All of the bistables of the storage cells 11 and the read cells 12 in two adjacent columns are connected to a common bit write line. Thus, a bit write line 43 is connected to all of the bistables of the storage cells 11 and the read cells 12 in the first and second columns, and a bit write line 44 is connected to all of the bistables of the storage cells 11 and the read cells 12 in the third and fourth columns of the associative array 10.

Each of the columns of the bistables of the storage cells 11 and the read cells 12 has a second bit write line. Thus, the bistables of the storage cells 11 and the read cells 12 in the first column are connected to a bit write line 45 while the bistables of the storage cells 11 and the read cells 12 in the second column are connected to a bit write line 46. The bistables of the storage cells 11 and the read cells 12 in the third column of the associative array 10 are connected to a bit write line 47 while the bistables of the storage cells 11 and the read cells 12 in the fourth column are connected to a bit write line 48.

Each of the bit write lines 43, 45, and 46 is connected to a write gate 50. The bit write lines 45 and 46 are connected to each other prior to being connected to the write gate 50.

Similarly, each of the bit write lines 44, 47, and 48 is connected to a second write gate 51. The bit write lines 47 and 48 are connected to each other prior to being connected to the write gate 51.

In writing data in the rows of the storage cells 11 and the rows of the read cells 12 in FIG. 2, the odd/even decoder 42 is activated to cause the write word decoder 30 to be connected to only one of the two horizontal word lines such as the word lines 40 and 41, for example, for one of the rows of the storage cells 11. The, the write gate 50 activates the bistables $S_{11}$ and $S_{12}$, which form one of the storage cells 11, at the same time to cause writing through the common bit write line 43 and one of the bit write lines 45 and 46. If the line 40 is selected by the odd/even decoder 42 with the write gate 50 activated, the bistable $S_{11}$ has the appropriate bit (one or zero) written therein if not already present. At the same time, the write gate 51 activates the bit write lines 44 and 47 to also cause writing in the bistable $S_{13}$.

Similarly, when writing the other half of the search word in the particular row, the word line 41 would be connected through the odd/even decoder 42 to the write word decoder 30. With the write gates 50 and 51 activated, writing of data occurs in the even columns of the bistables $S_{12}$, $S_{14}$, etc. of the storage cells 11 in the row of the storage cells 11.

When the read cells 12 are to be written from the write word decoder 30, the odd/even decoder 42 is again activated to connect the write word decoder 30 to the read cells 12 in the odd columns. This results in writing the read cells $R_{11}$, $R_{12}$, etc. It is necessary for the write gates 50 and 51 to be activated as for the writing of the search word.

When searching, the search argument decoders 20 would be connected in the same manner as previously described for FIG. 1. The OR gate 42' enables sampling of both of the word lines 40 and 41 to insure that there is no mismatch on either of the lines 40 and 41 before the lower potential is supplied through the match detector 15, which inverts the potential, to the word line 16 to indicate that the search word is in the row containing the bistables $S_{11}$, $S_{12}$, etc.

Figure 3B:
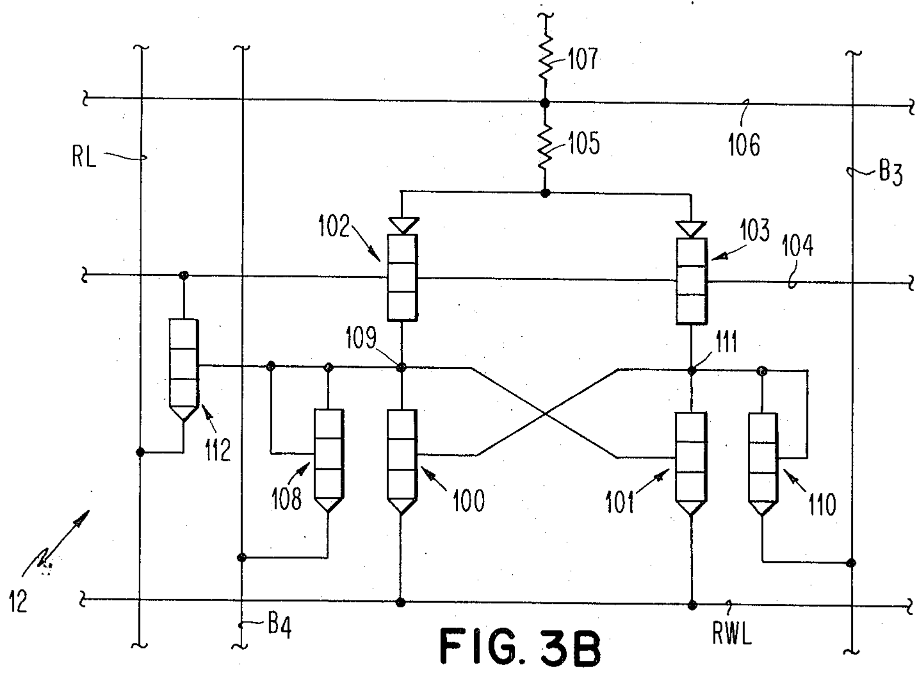
FIG. 3B is a circuit diagram of one of the read cells of the associative array of the present invention.
Figures 3A, 4, 5:
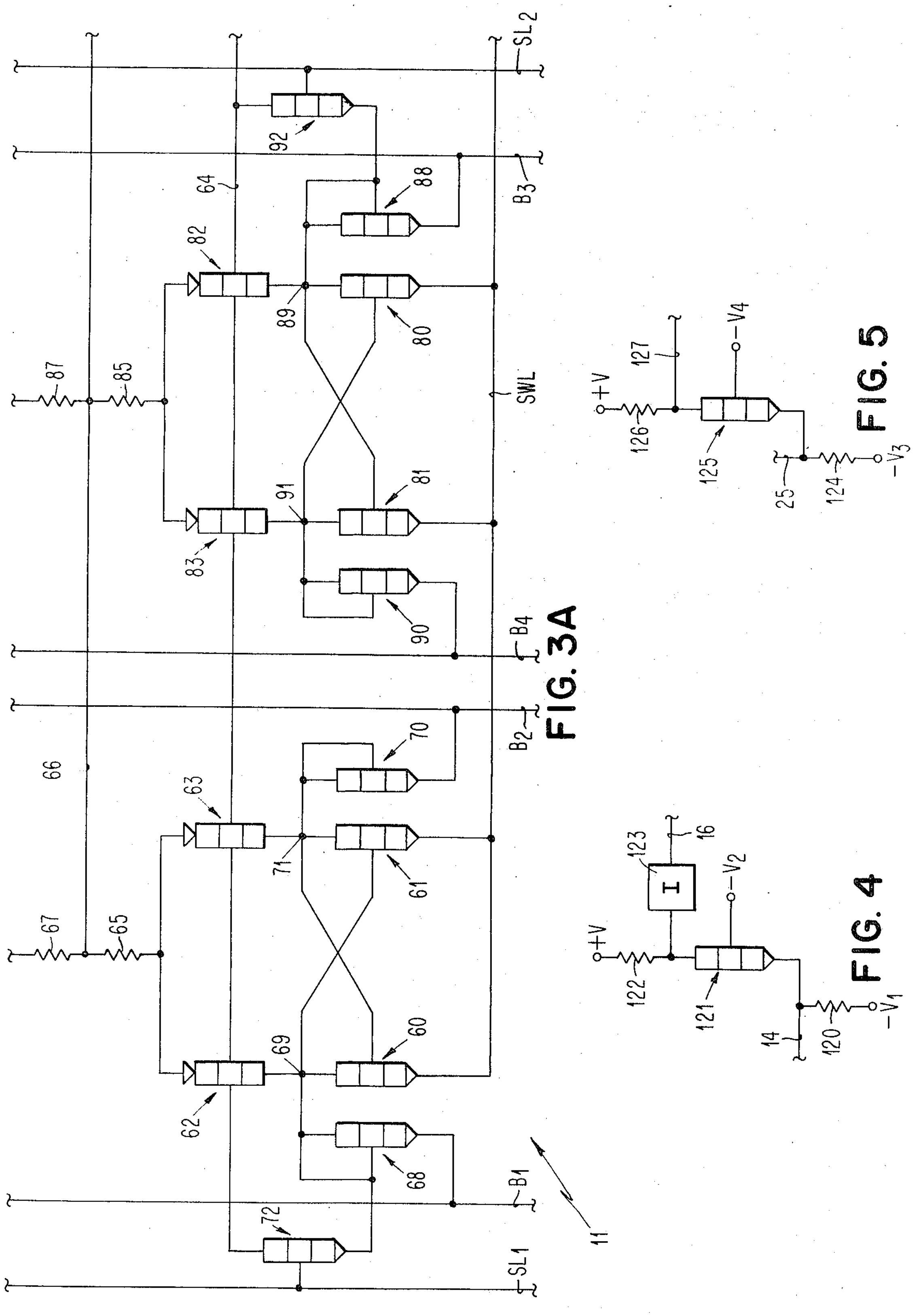
FIG. 3A is a circuit diagram of the two bistables forming one of the storage cells of the associative array of the present invention.
FIG. 4 is a schematic circuit diagram showing the connection between a word line for a row of storage cells and a word line for the read cells.
FIG. 5 is a schematic circuit diagram of signal generating means for transmitting the output of a read cell.

Referring to FIG. 3A, there is shown one of the storage cells 11 for use with the associative array 10 of FIG. 1. The storage cells 11 include a pair of bistables with each bistable being a mirror image of the other.

The left bistable of the storage cell 11 includes a pair of NPN transistors 60 and 61 having their emitters connected to a word line SWL. The base of each of the transistors 60 and 61 is connected to the collector of the other so that the transistors 60 and 61 are arranged as a cross-coupled flip-flop circuit.

The transistor 60 has its collector connected to a PNP transistor 62, which functions as a constant current source. The transistor 61 has its collector connected to a PNP transistor 63, which functions as a constant current source.

The bases of the transistors 62 and 63 are connected to a common negative voltage line 64, which is at a voltage of −1.5 volts. The emitters of the transistors 62 and 63 are connected through a resistor 65 to a common power distribution line 66. The resistor 65 determines the current through each of the transistors 62 and 63.

The common power distribution line 66 extends between the storage cells 11 of two separate rows and is connected by a resistor 67 to the left bistable of the storage cell 11 above the left bistable of FIG. 3A. The resistor 67 functions for the same purpose as the resistor 65.

A diode 68, which is an NPN transistor having its base and collector connected to each other, is connected to a node 69 and to a bit write line $B_1$. The bit write line $B_1$ corresponds to the bit write line 33, for example, of the associative array 10 of FIG. 1.

A diode 70, which is an NPN transistor having its collector and base connected to each other, is connected to a node 71 and to a bit write line $B_2$. The bit write line $B_2$ corresponds to the bit write line 34, for example, of the associative array 10 of FIG. 1.

A search line $SL_1$, which corresponds to the search line 21, for example, of the associative array 10 of FIG. 1, is connected through an NPN transistor 72 to the left bistable of the storage cell 11 of FIG. 3A. The transistor 72 has its base connected to the search line $SL_1$, its emitter connected to the node 69, and its collector connected to the negative voltage line 64.

The left bistable of the storage cell 11 of FIG. 3A has two stable states. In one of these states, the transistor 60 is conducting and saturated while the transistor 61 is turned off. In the other state, the transistor 61 is conducting and saturated with the transistor 60 turned off. The low voltage across the saturated transistor 60 or 61 prevents the other of the transistors 60 and 61 from conducting.

The bit write lines $B_1$ and $B_2$ are normally biased at a high potential, and the search line $SL_1$ is normally biased at a low potential. This prevents the diodes 68 and 70 and the transistor 72 from conducting.

If it is assumed that the transistor 60 is turned on and the transistor 61 is turned off and it is desired to change the state of the left bistalbe of the storage cell 11 of FIG. 3A, it is necessary to turn the transistor 61 on. Thus, to write this information in the left bistable of the storage cell 11, the potential of the word line SWL is raised to select this row of the storage cells 11. The potential of the bit write line $B_2$ is lowered to draw the load current of the transistor 63 away from the base of the transistor 60 to stop the transistor 60 from conducting.

When the transistor 60 ceases to conduct, the load current of the transistor 62 is diverted to the base of the transistor 61, and the transistor 61 conducts and becomes saturated. Then, the potential of the bit write line $B_2$ is raised, and the transistor 61 continues to conduct.

Similarly, if it is assumed that the transistor 61 is turned on and the transistor 60 is turned off and it is desired to change the state of the left bistable of the storage cell 11 of FIG. 3A, it is necessary to turn the transistor 60 on. To write this information in the storage cell 11, the potential of the word line SWL is raised to select this row of the storage cells 11. The potential of the bit write line $B_1$ is lowered to draw the load current of the transistor 62 away from the base of the transistor 61 to stop the transistor 61 from conducting.

When the transistor 61 ceases to conduct, the load current of the transistor 63 is diverted to the base of the transistor 60, and the transistor 60 conducts and becomes saturated. Then, the potential of the bit write line $B_1$ is raised, and the transistor 60 continues to conduct.

The right bistable of the storage cell 11 of FIG. 3A includes a pair of NPN transistors 80 and 81 having their emitters connected to the word line SWL. The base of each of the transistors 80 and 81 is connected to the collector of the other so that the transistors 80 and 81 are arranged as a cross-coupled flip-flop circuit.

The transistor 80 has its collector connected to a PNP transistor 82, which functions as a constant current source. The transistor 81 has its collector connected to a PNP transistor 83, which functions as a constant current source.

The bases of the transistors 82 and 83 are connected to the common voltage line 64. The emitters of the transistors 82 and 83 are connnected through a resistor 85 to the common power distribution line 66. The resistor 86 determines the current through each of the transistors 82 and 83.

As previously mentioned, the common power distribution line 66 extends between the storage cells 11 of the two separate row so that the line 66 is connected by a resistor 87 to the right bistable of the storage cell 11 above the right bistable of FIG. 3A. The resistor 87 functions for the same purpose as the resistor 85.

A diode 88, which is an NPN transistor having its base and collector connected to each other, is connected to a node 89 and to a bit write line $B_3$. The bit write line $B_3$ corresponds to the bit write line 36, for example, of the associative array 10 of FIG. 1.

A diode 90, which is an NPN transistor having its collector and base connected to each other, is connected to a node 91 and to a bit write line $B_4$. The bit write line $B_4$ corresponds to the bit write line 35, for example, of the associative array 10 of FIG. 1.

A search line $SL_2$, which corresponds to the search line 22, for example, of the associative array 10 of FIG. 1, is connected through an NPN transistor 92 to the right bistable of the storage cell 11 of FIG. 3A. The transistor 92 has its base connected to the search line $SL_2$, its emitter connected to the node 89, and its collector connected to the negative voltage line 64.

The right bistable of the storage cell 11 of FIG. 3A has two stable states. In one of these states, the transistor 80 is conducting and saturated while the transistor 81 is turned off. In the other state, the transistor 81 is conducting and saturated with the transistor 80 turned off. The low voltage across the saturated transistor 80 or 81 prevents the other of the transistors 80 and 81 from conducting.

The bit write lines $B_3$ and $B_4$ are normally biased at a high potential, and the search line $SL_2$ is normally biased at a low potential. This prevents the diodes 88 and 90 and the transistor 92 from conducting.

If it is assumed that the transistor 80 is turned on and the transistor 81 is turned off and it is desired to change the state of the right bistable of the storage cell 11 of FIG. 3A, it is necessary to turn the transistor 81 on. Thus, to write this information in the right bistable of the storage cell 11, the potential of the word line SWL is raised to select this row of the storage cells 11. The potential of the bit write line $B_4$ is lowered to draw the load current of the transistor 83 away from the base of the transistor 80 to stop the transistor 80 from conducting.

When the transistor 80 ceases to conduct, the load current of the transistor 82 is diverted to the base of the transistor 81, and the transistor 81 conducts and becomes saturated. Then, the potential of the bit write line $B_4$ is raised, and the transistor 81 continues to conduct.

Similarly, if it is assumed that the transistor 81 is turned on and the transistor 80 is turned off and it is desired to change the state of the right bistable of the storage cell 11 of FIG. 3A, it is necessary to turn the transistor 80 on. To write this information in the storage cell ll, the potential of the word line SWL is raised to select this row of the storage cells 11. The potential of the bit write line $B_3$ is lowered to draw the load current of the transistor 82 away from the base of the transistor 81 to stop the transistor 81 from conducting.

When the transistor 81 ceases to conduct, the load current of the transistor 83 is diverted to the base of the transistor 80, and the transistor 80 conducts and becomes saturated. Then, the potential of the bit write line $B_3$ is raised, and the transistor 80 continues to conduct.

The storage cell 11 is considered to be in its zero state when the transistors 60 and 81 are on. The storage cell 11 is considered to be in its one state when the transistors 61 and 80 are conducting. When the storage cell 11 is in its don't care state, which is either a zero or one insofar as satisfying any search argument, the transistors 61 and 81 are on.

Thus, when searching for a one in the storage cell 11, the storage cell 11 indicates that the search argument for a one is satisfied when either the transistors 61 and 80 or the transistors 61 and 81 are on. When searching for a zero in the storage cell 11, the search argument is satisfied whenever the transistors 60 and 81 or 61 and 81 are conducting.

When searching for a one in the storage cell 11, the search line $SL_1$ has its potential raised. When searching for a zero, the search line $SL_2$ has its potential raised.

The word line SWL is maintained at a negative voltage by a negative voltage being supplied thereto through a resistor. If the storage cell 11 satisfies the search argument, there is no increase in the voltage in the search word line SWL, and the potential on the word line SWL remains at its lower magnitude. When there is no increase in the potential on the word line SWL, then the match detector, when inverts the potential on the word line SWL, causes the potential of higher magnitude to continue to be supplied to the connected read cells 12 and enable them to be read.

When there is a mismatch of any of the storage cells 11 in the row during search, then the potential on the word line SWL is raised. As a result, the potential to the word line of the connected read cells 12 is lower so that the read cells 12 do not produce an output to the read output lines 25 and 26, for example.

When searching for a one, the search line $SL_1$ has its potential raised about one volt above the potential of the word line SWL. If the transistor 60 is conducting at this time, then the storage cell 11 is not in its one state but is in its zero state.

Thus, if the transistor 60 is conducting so that the storage cell 11 is in its zero state, the transistor 72 conducts when the search line $SL_1$ has its potential raised about one volt above the potential of the word line SWL. As a result of the transistor 72 conducting with the transistor 60 saturated, there is an increase in current flow through the resistor, which is between the negative voltage source and the word line SWL. This raises the potential of the word line SWL with this increased potential being detected as a mismatch by the match detector. This increase in the voltage decreases the potential on the word line of the connected read cells 12 to prevent them from providing an output to the read output lines 25 and 26 since the search word, which is formed by the row of the storage cells 11, did not satisfy the search argument of the storage cell 11 being at one.

If the transistor 60 is off and the transistor 61 on, then the storage cell 11 is in its one state since it does not matter what the state of the right bistable of the storage cell 11 is. That is, it is immaterial whether the transistor 80 or 81 is conducting since either condition causes the storage cell 11 to be detected as being at a one. This is because the storage cell 11 is in the don't care state, which is a one or a zero, when the transistor 81 is conducting and in a one state when the transistor 80 is conducting.

When the transistor 61 is on and the transistor 60 is off, raising of the potential of the search line $SL_1$ does not cause the transistor 72 to conduct. As a result, the potential of the word line SWL does not change whereby the read cells 12, which are connected through their word line and the match detector to the word line SWL, provide an output to the read output lines 25 and 26.

When searching for a zero, the potential of the search line $SL_2$ is raised by one volt above the word line SWL. If the transistor 81 is conducting, then the storage cell 11 is either in the zero state or the don't care state. In the zero state, the transistor 60 is conducting while the transistor 61 conducts during the don't care state. In either state, the storage cell 11 satisfies the search argument for a zero.

Accordingly, when the search line $SL_2$ has its potential raised and the transistor 81 is conducting, the transistor 92 does not conduct. As a result, the potential of the word line SWL remains the same to indicate a match so that the connected read cells 12 can provide an output to the read output lines 25 and 26.

If the transistor 80 is conducting when the search line $SL_2$ has its potential raised to look for a zero, then the transistor 92 conducts. Again, this raises the potential of the word line SWL to cause a decrease in the potential on the word line for the connected read cells 12. As a result, these read cells 12 cannot provide an output to the read output lines 25 and 26.

Since the left bistable of the storage cell 11 of FIG. 3A is in the leftmost column, the column power distribution line 66 is shown as terminating at the junction of the resistors 65 and 67. However, for any of the other storage cells 11, the line 66 would continue on to the left beyond the junction with the resistors 65 and 67.

Similarly, the line 64 is shown terminating at the collector of the transistor 72. It also would continue beyond the transistor 72 for any of the other storage cells 11 except for the leftmost column.

The word line SWL is shown terminating at the transistor 60. Except for the leftmost storage cell 11, the word line SWL continues beyond the transistor 60 to the left.

Referring to FIG. 3B, there is shown one of the read cells 12. The read cells 12 comprises a single bistable having a pair of NPN transistors 100 and 101. The transistors 100 and 101 have their emitters connected to a word line RWL. The base of each of the transistors 100 and 101 is connected to the collector of the other so that the transistors 100 and 101 are arranged as a cross-coupled flip-flop circuit.

The transistor 100 has its collector connected to a PNP transistor 102, which functions as a constant current source. The transistor 101 has its collector connected to a PNP transistor 103, which functions as a constant current source.

The bases of the transistors 102 and 103 are connected to a common negative voltage line 104, which has the same negative voltage as the negative voltage line 64. The emitters of the transistors 102 and 103 are connected through a resistor 105 to a common power distribution line 106, which has the same potential as the common power distribution line 66. The resistor 105 determines the current through each of the transistors 102 and 103.

The common power distribution line 106 extends between the read cells 12 of two separate rows and is connected by a resistor 107 to the read cell 12 above the read cell 12 of FIG. 3B.

A diode 108, which is an NPN transistor having its base and collector connected to each other, is connected to a node 109 and to the bit write line $B_4$, for example. The bit write line $B_4$ corresponds to the bit write line 35, for example, of the associative array 10 of FIG. 1 as previously mentioned with respect to the storage cell 11 of FIG. 3A.

A diode 110, which is an NPN transistor having its collector and base connected to each other, is connected to a node 111 and to the bit write line $B_3$, for example. The bit write line $B_3$ corresponds to the bit write line 36, for example, of the associative array 10 of FIG. 1 as previously mentioned with respect to the storage cell 11 of FIG. 3A.

A read output line RL, which corresponds to the read output line 25, for example, of the associative array 10 of FIG. 1, is connected through an NPN transistor 112 to the read cell 12 of FIG. 3B. The transistor 112 has its emitter connected to the read output line RL, its base connected to the node 109, and its collector connected to the negative voltage line 104.

The read cell 12 has two stable states. In one of these states, the transistor 100 is conducting and is saturated while the transistor 101 is turned off (This is the zero state.). In the other state, the transistor 101 is conducting and saturated with the transistor 100 turned off (This is the one state.). The low voltage across the saturated transistor 100 or 101 prevents the other of the transistors 100 and 101 from conducting.

As previously mentioned, the bit write lines $B_4$ and $B_3$ are normally biased at a high potential. This prevents the diodes 108 and 110 from conducting.

Whenever the potential on the word line RWL is at the higher of its two potentials, the transistor 112 conducts if the transistor 101 is saturated. The conduction of the transistor 112 raises the potential of the read output line RL, which can be the read output line 25 or 26, for example, so that the connected read detector 23 or 25 has an output of one. The read output line RL is connected to a negative voltage source through a resistor.

If the transistor 100 is conducting when the potential of the word line RWL is at the higher magnitude, the transistor 112 does not conduct so that the potential of the read output line RL does not change. This is considered to be a zero.

As previously mentioned, the word line RWL of the read cell 12 goes up whenever the word line SWL of the storage cell 11 stays down due to a match during a search of all of the storage cells 11 connected to the word line SWL. Therefore, whenever there is a search being made, reading from each of the read cells 12 on the word line RWL occurs whenever there is no mismatch in the connected storage cells 11.

Whenever it is desired to write new data in the read cell 12, the word line RWL must have its potential raised with the match detector inactivated and one of the bit lines $B_4$ and $B_3$ must have its potential lowered. If it is assumed that the transistor 100 is turned on and the transistor 101 is turned off and it is desired to change the state of the read cell 12 to a one, it is necessary to turn the transistor 101 on. To write this information in the read cell 12, the potential of the read word line RWL is raised with the match detector inactivated to select this row of the read cells 12. The potential of the bit write line $B_3$ is lowered to draw the load current of the transistor 103 away from the base of the transistor 100 to stop the transistor 100 from conducting.

When the transistor 100 ceases to conduct, the load current of the transistor 102 is diverted to the base of the transistor 101, and the transistor 101 conducts and becomes saturated. Then, the potential of the bit write line $B_3$ is raised, and the transistor 101 continues to conduct.

Similarly, if it is assumed that the transistor 101 is turned on and the transistor 100 is turned off and it is desired to change the state of the read cell 12 to a zero, it is necessary to turn the transistor 100 on. To write this information in the read cell 12, the potential of the word line RWL is raised with the match detector inactivated to select this row of the read cells 12. The potential of the bit write line $B_4$ is lowered to draw the load current of the transistor 102 away from the base of the transistor 101 to stop the transistor 101 from conducting.

When the transistor 101 ceases to conduct, the load current of the transistor 103 is diverted to the base of the transistor 100, and the transistor 100 conducts and becomes saturated. Then, the potential of the bit write line $B_4$ is raised, and the transistor 100 continues to conduct.

The storage cell 11 of FIG. 3A and the read cell 12 of FIG. 3B can be readily employed with the associative array 10 of FIG. 2. The only requirement would be for the bit write lines $B_2$ and $B_4$ to be a common bit write line such as the bit write line 43 or 44, for example.

As previously mentioned, a negative voltage potential is applied to each of the work lines for the storage cells 11. In FIG. 4, the word line 14 is shown connected to a negative voltage $-V_1$ through a resistor 120. The potential at the junction of the word line 14 and the resistor 120 also is connected to the emitter of an NPN transistor 121, which has its base connected to a negative voltage $-V_2$. The negative voltage $-V_2$ is more positive than the negative voltage $-V_1$, which is applied to the word line 14 through the resistor 120.

The collector of the transistor 121 is connected through a resistor 122 to a positive voltage source +V. An inverter 123 connects the collector of the transistor 121 to the read word line 16 to invert the potential at the collector of the transistor 121 when it is supplied to the read word line 16. Thus, the transistor 121 and the inverter 123 form the match detector 15.

When there is a match of the bistables $S_{11}$, $S_{12}$, etc. of the storage cells 11 connected to the word line 14, the potential on the word line 14 is lower than the voltage at the base of the transistor 121 whereby the lower transistor 121 conducts. Thus, the voltage at the collector of the transistor 121 is low and is inverted by the inverter 123 to become a high potential on the read word line 16.

When there is a mismatch of the bistables $S_{11}$, $S_{12}$, etc. of the storage cells 11 connected to the word line 14, the potential on the word line 14 rises so that the voltage at the emitter of the transistor 121 increases to turn off the transistor 121. This increases the voltage of the collector of the transistor 121, and this high potential becomes a low voltage on the read word line 16 because of the inverter 123.

As previously mentioned, a negative voltage is applied to the read output lines such as the read output line 25, for example. As shown in FIG. 5, a negative voltage $-V_3$ is applied through a resistor 124 to the read output line 25. The read output line 25 has the emitter of an NPN transistor 125 connected thereto at the connection of the read output line 25 to the resistor 124. The base of the transistor 125 is biased to a negative voltage $-V_4$, which is more positive than the negative voltage $-V_3$ so that the transistor 125 conducts due to the positive voltage +V being applied through a resistor 126 to the collector of the transistor 125. A line 127 connectes the collector of the transistor 125 to the read detector 23.

Accordingly, when one of the read cells 12, which is connected to the read output line 25, is in its one state and becomes conductive because the connected read word line 16 has its potential raised, the transistor 125 is turned off due to the potential at its emitter being increased because of the conduction of the read cell 12 connected to the read output line 25. As a result, the voltage at the collector of the transistor 125 increases, and this is supplied by the line 127 to the read detector 23 to indicate a one.

An advantage of this inventin is that the storage and read cells of an associative array can be arranged in a substantially square design area on a chip. Another advantage of this invention is that it reduces the area required for power distribution lines through using a single line for a pair of adjacent rows of the memory cells. A further advantage of this invention is that it reduces the number of read bit lines by 50 percent.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An associative array including:

a plurality of memory cells arranged in rows and columns;

some of said rows of said memory cells forming rows of storage cells with said storage cells of each row being a word;

the remainder of said rows of said cells forming rows of read cells, the number of said rows of said read cells being one-half the number of said rows of said storage cells;

each of said storage cells being formed by said memory cells in two adjacent columns;

each of said read cells being formed by one of said memory cells;

each of said rows of said read cells providing outputs for two of said rows of said storage cells;

said two rows of said storage cells and said row of said read cells providing outputs for said two rows of said storage cells being adjacent each other;

first means to connect one of said adjacent rows of said storage cells to one-half of said read cells in said adjacent row of said read cells with said connected read cells being in odd columns;

second means to connect the other of said adjacent rows of said storage cells to the other half of said read calls in said adjacent row of said read cells with said connected read cells being in even columns;

said storage cells of said one adjacent row transmitting a signal through said first connecting means to said connected read cells when an address to all of said rows of said storage cells selects the word of said one adjacent row to cause said connected read cells to provide an output;

and said storage cells of said other adjacent row transmitting a signal through said second connecting means to said connected read cells when an address to all of said rows of said storage cells selects the word of said other adjacent row to cause said connected read cells to provide an output.

2. The array according to claim 1 including means connecting the output of one of said read cells for each of said rows of said storage cells to each other to produce an output when the addressed word is in at least one of said rows of said storage cells.

3. The array according to claim 2 in which:

said storage cell in the two adjacent columns in each of said rows and said cells in the same two adjacent columns in each of said rows has a common bit line;

one of said memory cells of each of said storage cells and each of said read cells in one of the two adjacent columns is connected to a second common bit line;

and the other of said memory cells of each of said storage cells and each of said read cells in the other of the two adjacent columns is connected to a third common bit line.

4. The array according to claim 3 in which each of said first and second connecting means comprises a first line connected to one of said memory cells of each of said storage cells in each of said rows in one of the two adjacent columns connected to a common bit line and a second line connected to the other of said memory cells of each of said storage cells in each of said rows in the other of the two adjacent columns connected to the common bit line.

5. The array according to claim 2 in which said memory cell of each of said storage cells and each of said read cells in the same column are connected to the same two bit lines.

6. The array according to claim 1 in which said rows of said storage cells and said read cells are arranged with two of said rows of said read cells adjacent each other and having four of said rows of said storage cells above and below except that the uppermost two of said rows of said read cells have only two of said rows of said storage cells thereabove and the lowermost two of said rows of said read cells have only two of said rows of said storage cells therebeneath.

7. The array according to claim 6 in which:

a common power distribution line extends between each two adjacent rows of said storage cells to supply a current to each of said memory cells in each of said two adjacent rows;

and a common power distribution line extends between each two adjacent rows of said read cells to supply a current to each of said read cells in each of said two adjacent rows.

8. The array according to claim 1 in which:

said storage cell in the two adjacent columns in each of said rows and said read cells in the same two adjacent columns in each of said rows has a common bit line;

one of said memory cells of each of said storage cells and each of said read cells in one of the two adjacent columns is connected to a second common bit line;

and the other of said memory cells of each of said storage cells and each of said read cells in the other of the two adjacent columns is connected to a third common bit line.

9. The array according to claim 1 in which said memory cell of each of said storage cells and each of said read cells in the same column are connected to the same two bit lines.

10. The array according to claim 1 in which:

each of said memory cells forming said storage cells includes:

a pair of transistors;

each of said transistors having a first output electrode, a second output electrode, and a control electrode;

means cross coupling the first output electrode of each of said transistors to the control electrode of the other of said transistors whereby said pair of transistors forms a bistable circuit;

a separate constant current source connected to the first output electrode of each of said pair of transistors;

and a third transistor having a first output electrode, a second output electrode, and a control electrode;

a word line connected with at least the odd or even columns of said memory cells in one of the rows of said memory cells forming said storage cells;

each of said word lines having a potential thereon;

each of said first connecting means including at least one of said word lines;

each of said second connecting means including at least one of said word lines;

each of said transistors of said pair of transistors of each of said memory cells having its second output electrode connected to one of said word lines;

a plurality of search lines with each associated with a column of said memory cells forming said storage cells;

each of said search lines being connected to the control electrode of each of said third transistors of said memory cells forming said storage cells in the column;

said third transistor having its first output electrode connected to the second output electrode of one of said pair of transistors;

said third transistor having its second output electrode connected to a negative voltage line;

said third transistor being conductive when said search line has its potential raised and said one transistor is saturated to reduce the potential on said connected word line, said third transistor not being conductive when said search line has its potential raised and the other of said pair of transistors is saturated to not affect the potential on said connected word line;

and said read cells connected to said memory cells in each row of said storage cells through one of said first and second connecting means producing the output when the potential on any of said word lines connected to said memory cells in the same row of said storage cells is not reduced.

11. The array according to claim 1 in which:

each of said memory cells forming said read cells includes:

a pair of transistors;

each of said transistors having a first output electrode, a second output electrode, and a control electrode;

means cross coupling the first output electrode of each of said transistors to the control electrode of the other of said transistors whereby said pair of transistors forms a bistable circuit;

a separate constant current source connected to the first output electrode of each of said pair of transistors;

and a third transistor having a first output electrode, a second output electrode, and a control electrode;

a plurality of read word lines;

each of said read word lines being connected with said read cells in only the odd or even columns of one of the rows of said read cells;

each of said transistors of said pair of transistors having the second output electrode connected to said read word line;

a plurality of read lines with each associated with two adjacent columns of said read cells;

each of said read lines being connected to the first output electrode of each of said third transistors of said read cells in the two adjacent columns;

said thrid transistor having its control electrode connected to the second output electrode of one of said pair of transistors;

said third transistors having its second output electrode connected to a negative voltage line;

each of said read word lines being connected to a source of potential that decreases when said connected read cells are not to produce an output on said read lines;

and said third transistor being conductive when the potential of said read word line is not reduced to produce a potential on said read line, the magnitude of the potential produced on said read line being higher when one of said transistors of said pair of transistors is saturated than when the other of said transistors of said pair of transistors is saturated so as to indicate the state of said read cell in accordance with which of said pair of transistors is saturated.

12. An associative array having:
memory cells arranged in rows and columns, a storage cell being formed by said memory cells in two adjacent columns in the same row;
each of said memory cells including:
a pair of transistors;
each of said transistors having a firs output electrode, a second output electrode, and a control electrode;
means cross coupling the first output electrode of each of said transistors to the control electrode of the other of said transistors whereby said pair of transistors forms a bistable circuit;
a separate constant current source connected to the first output electrode of each of said pair of transistors;
and a third transistor having a first output electrode, a second output electrode, and a control electrode;
a plurality of word lines, each od said word lines having a potential thereon;
each of said word lines being connected with said memory cells in one of the rows of said memory cells and with at least the odd or even columns of said memory cells of the row;
each of said transistors of said pair of transistors having its second output electrode connected to said word line;
a plurality of search lines with each associated with a column of said memory cells;
each of said search lines being connected to the control electrode of each of said third transistors of said memory cells in the column;
said third transistor having its first output electrode connected to the second output electrode of one of said pair of transistors;
said third transistor having its second output electrode connected to a negative voltage line;
said third transistor being conductive when said connected search line has its potential raised and said one transistor of said pair of transistors is saturated to reduce the potential on said connected word line, said third transistor not being conductive when said connected search line has its potnetial raised and the other of said pair of transistors is saturated to not affect the potential on said connected word line;
and separate means connected to said memory cells in eachrow through any of said word lines connected to said memory cells in the same row to produce an output when the potential on any of said word lines connected to said memory cells in the same row is not reduced.

13. The array according to claim 12 in which:
said separate means includes memory cells arranged in rows and columns, a read cell being formed by each of said memory cells;
each of read cells includes:
a pair of transistors;
each of said transistors having a first output electrode, a second output electrode, and a control electrode;
means cross coupling the first output electrode of each of said transistors to the control electrode of the other of said transistors whereby said pair of transistors forms a bistable circuit;
a separate constant current source connected to the first output electrode of each of said pair of transistors;
and a third transistor having a first output electrode, a second output electrode, and a control electrode;
a plurality of read word lines;
each of said read word lines being connected with said read cells in one of the rows of said read cells;
each of said transistors of said pair of transistors of said read cells having the second output electrode connected to one of said read word lines;
a plurality of read lines with each associated with at least one column of said read cells;
each of said read lines being connected to the first output electrode of each of said third transistors of said read cells in at least the one column;
said third transistor having its control electrode connected to the second output electrode of one of said pair of transistors;
said third transistor having its second output electrode connected to a negative voltage line;
each of said read word lines being connected to one of said rows of said memory cells functioning as said storage cells through any of said storage word lines connected to the row to produce an output when the row of said memory cells functioning as said storage cells satisfies the search argument so that the potential on any of said stroage word lines connected to said read word line is not reduced;
and said third transistor of said read cell being conductive when the potential of said connected read word line is not reduced to produce a potential on said read line, the magnitude of the potential produced on said read line being higher when one of said transistors of said pair of transistors of said read cell is saturated than when the other of said transistors of said pair of transistors of said read cell is saturated so as to indicate the state of said read cell in accordance with which of said pair of transistors is saturated.

14. The array according to claim 13 in which each of said word lines connected to said memory cells functioning as said storage cells is connected with said memory cells in both the odd and even columns of said memory cells in one of the rows of said memory cells.

15. The array according to claim 13 in which each of said word lines connected to said memory cells functioning as said storage cells is connected only with said memory cells in the odd or even columns of one of the rows of said memory cells.

16. The array according to claim 12 in which:
said separate means includes memory cells arranged in rows and columns, a read cell being formed by each of said memory cells;
each of said separate means comprises the odd or even columns of said read cells in one of said rows;
each of said read cells includes:
a pair of transistors;

each of said transistors having a first output electrode, a second output electrode, and a control electrode;

means cross coupling the first output electrode of each of said transistors to the control electrode of the other of said transistors whereby said pair of transistors forms a bistable circuit;

a separate constant current source connected to the first output electrode of each of said pair of transistors, and a third transistor having a first output electrode, a second output electrode, and a control electrode;

a plurality of read word lines;

each of said read word lines being connected with said read cells in only the odd or even columns of one of the rows of said read cells;

each of said transistors of said pair of transistors of said read cells having the second output electrode connected to one of said read word lines;

a plurality of read lines with each associated with two adjacent columns of said read cells;

each of said read lines being connected to the first output electrode of each of said third transistors of said read cells in the two adjacent columns;

said third transistor having its control electrode connected to the second output electrode of one of said pair of transistors;

said third transistor having its second output electrode connected to a negative voltage line;

each of said read word lines being connected to one of said rows of said memory cells functioning as said storage cells through any of said connected storage word lines to produce an output when the row of said memory cells functioning as said storage cells satisfies the search argument so that the potential on any of said storage word lines connected to said read word line is not reduced;

and said third transistor of said read cell being conductive when the potential of said connected read word line is not reduced to produce a potential on said read line, the magnitude of the potential produced on said read line being higher when one of said transistors of said pair of transistors of said read cell is saturated than when the other of said transistors of said pair of transistors of said read cell is saturated so as to indicate the state of said read cell in accordance with which of said pair of transistors is saturated.

17. The array according to claim 16 in which each of said word lines connected to said memory cells functioning as said storage cells is connected with said memory cells in both the odd and even columns of said memory cells in one of the rows of said memory cells.

18. The array according to claim 16 in which each of said word lines connected to said memory cells functioning as said storage cells is connected only with said memory cells in the odd or even columns of one of the rows of said memory cells.

19. The array according to claim 12 in which each of said word lines is connected with said memory cells in both the odd and even columns of said memory cells in one of the rows of said memory cells.

20. The array according to claim 12 in which each of said word lines is connected only with said memory cells in the odd or even columns of one of the rows of said memory cells.

21. An associative array having:

memory cells arranged in rows and columns, a read cell being formed by each of said memory cells;

each of said read cells including:

a pair of transistors;

each of said transistors having a first output electrode, a second output electrode, and a control electrode;

means cross coupling the first output electrode of each of said transistors to the control electrode of the other of said transistors whereby said pair of transistors forms a bistable circuit;

a separate constant current source connected to the first output electrode of each of said pair of transistors;

and a third transistor having a first output electrode, a second output electrode, and a control electrode;

a plurality of word lines;

each of said word lines being connected with said read cells in only the odd or even columns of one of the rows of said read cells;

each of said transistors of said pair of transistors having the second output electrode connected to one of said word lines;

a plurality of read lines with each associated with two adjacent columns of said read cells;

each of said read lines being connected to the first output electrode of each of said third transistors of said read cells in the two adjacent columns;

said third transistor having its control electrode connected to the second output electrode of one of said pair of transistors;

said third transistor having its second output electrode connected to a negative voltage line;

each of said word lines being connected to a source of potential that decreases when said connected read cells are not to produce an output on said read lines;

and said third transistor being conductive when the potential of said word line is not reduced to produce a potential on said read line, the magnitude of the potential produced on said read line being higher when one of said transistors of said pair of transistors is saturated than when the other of said transistors of said pair of transistors is saturated so as to indicate the state of said read cell in accordance with which of said pair of transistors is saturated.

* * * * *